(12) United States Patent
Flowers

(10) Patent No.: US 10,440,038 B2
(45) Date of Patent: Oct. 8, 2019

(54) CONFIGURATION MANAGEMENT FOR NETWORK ACTIVITY DETECTORS

(71) Applicant: EvengX, LLC, San Francisco, CA (US)

(72) Inventor: John S. Flowers, San Francisco, CA (US)

(*) Notice: Subject to any disclaimer, the term of this patent is extended or adjusted under 35 U.S.C. 154(b) by 0 days.

(21) Appl. No.: 15/889,069

(22) Filed: Feb. 5, 2018

(65) Prior Publication Data

US 2019/0058716 A1 Feb. 21, 2019

Related U.S. Application Data

(63) Continuation of application No. 14/666,815, filed on Mar. 24, 2015, now Pat. No. 9,888,018, which is a continuation of application No. 14/207,382, filed on Mar. 12, 2014, now Pat. No. 9,021,574.

(60) Provisional application No. 61/778,305, filed on Mar. 12, 2013.

(51) Int. Cl.
*G06F 21/55* (2013.01)
*H04L 29/06* (2006.01)

(52) U.S. Cl.
CPC ...... *H04L 63/1416* (2013.01); *H04L 63/0209* (2013.01); *H04L 63/0227* (2013.01); *H04L 63/20* (2013.01)

(58) Field of Classification Search
CPC ............. H04L 63/1416; H04L 63/0209; H04L 63/0227; H04L 63/20
USPC ........................................................ 726/23
See application file for complete search history.

(56) References Cited

U.S. PATENT DOCUMENTS

| 7,506,360 B1 | 3/2009 | Wilkinson et al. |
| 8,180,891 B1 | 5/2012 | Harrison |
| 8,347,391 B1* | 1/2013 | Flowers .............. H04L 63/1408 726/24 |
| 8,590,014 B1 | 11/2013 | Haugsnes |
| 9,021,574 B1* | 4/2015 | Flowers .............. H04L 63/0209 726/11 |
| 2006/0067282 A1* | 3/2006 | Sherman ............. H04L 12/2854 370/338 |
| 2006/0182282 A1* | 8/2006 | Negahdar ............. H04L 9/0825 380/277 |

(Continued)

OTHER PUBLICATIONS

Final Office Action received for U.S. Appl. No. 14/666,815, dated Apr. 8, 2016, 24 pages.

(Continued)

*Primary Examiner* — Haresh N Patel
(74) *Attorney, Agent, or Firm* — Dentons US LLP

(57) ABSTRACT

Network activity detectors, such as firewalls, communicate with one another to form a Unified Threat Management System. A first network activity detector sends a request for configuration settings to a second network activity detector. The second network activity detector sends a set of configuration settings in response to the request. The configuration settings include information for detecting digital security threats and/or for responding to detected digital security threats. In this way, configuration settings are propagated from one network activity detector to another so that network activity detectors within a UTMS system are configured consistently, e.g., have up-to-date information for detecting and/or responding to digital security threats.

21 Claims, 10 Drawing Sheets

(56) References Cited

U.S. PATENT DOCUMENTS

| | | | |
|---|---|---|---|
| 2007/0027970 A1* | 2/2007 | Backman | H04L 41/5035 709/223 |
| 2007/0101392 A1* | 5/2007 | Soin | G06F 9/441 725/132 |
| 2007/0277242 A1* | 11/2007 | Baker | G06F 21/554 726/25 |
| 2008/0295175 A1 | 11/2008 | Ansari et al. | |
| 2009/0158418 A1 | 6/2009 | Rao et al. | |
| 2009/0222877 A1* | 9/2009 | Diehl | H04L 63/0263 726/1 |
| 2009/0300730 A1* | 12/2009 | Chaudhry | H04L 63/1408 726/5 |
| 2010/0262688 A1* | 10/2010 | Hussain | H04L 63/1433 709/224 |
| 2011/0072506 A1* | 3/2011 | Law et al. | H04L 63/0227 726/11 |
| 2011/0194438 A1* | 8/2011 | Rahbar | H04J 3/0664 370/252 |
| 2011/0320522 A1* | 12/2011 | Endres | H04W 4/02 709/203 |
| 2012/0227104 A1* | 9/2012 | Sinha | H04L 63/0227 726/22 |
| 2013/0061309 A1* | 3/2013 | Diaz-Cuellar | H04L 63/102 726/9 |
| 2013/0088969 A1 | 4/2013 | Mukherjee et al. | |
| 2013/0103807 A1* | 4/2013 | Couto | H04W 12/06 709/220 |
| 2013/0191912 A1 | 7/2013 | Chakrabarti et al. | |
| 2013/0198245 A1 | 8/2013 | Kagan et al. | |
| 2013/0204450 A1 | 8/2013 | Kagan et al. | |
| 2013/0205022 A1 | 8/2013 | Kagan et al. | |
| 2013/0254879 A1 | 9/2013 | Chesla et al. | |
| 2014/0025321 A1 | 1/2014 | Spanier | |
| 2014/0026179 A1* | 1/2014 | Devarajan | G06F 21/51 726/1 |
| 2014/0068720 A1* | 3/2014 | Somers | H04L 63/1441 726/4 |
| 2014/0082237 A1* | 3/2014 | Wertheimer | G06F 13/4022 710/104 |
| 2014/0145861 A1 | 5/2014 | Goudy et al. | |
| 2014/0148998 A1 | 5/2014 | Goudy et al. | |
| 2014/0148999 A1 | 5/2014 | Goudy et al. | |
| 2014/0149031 A1 | 5/2014 | Goudy et al. | |
| 2014/0173731 A1 | 6/2014 | Mantripragada et al. | |
| 2014/0189859 A1* | 7/2014 | Ramanan | G06F 21/56 726/22 |
| 2014/0200782 A1 | 7/2014 | Goudy et al. | |
| 2014/0380467 A1 | 12/2014 | Winquist et al. | |
| 2015/0032362 A1 | 1/2015 | Goudy et al. | |
| 2015/0033341 A1 | 1/2015 | Schmidtler et al. | |
| 2015/0040220 A1 | 2/2015 | Mantripragada et al. | |

OTHER PUBLICATIONS

Non-Final Office Action received for U.S. Appl. No. 14/666,815, dated Feb. 1, 2017, 21 pages.
Non-Final Office Action received for U.S. Appl. No. 14/666,815, dated Sep. 14, 2015, 23 pages.
Notice of Allowance received for U.S. Appl. No. 14/666,815, dated Sep. 13, 2017, 5 pages.
Notice of Allowance received for U.S. Appl. No. 14/207,382, dated Mar. 10, 2015, 13 pages.

* cited by examiner

CONFIGURATION MANAGEMENT FOR NETWORK ACTIVITY DETECTORS

CROSS-REFERENCE TO RELATED APPLICATIONS

This application is a continuation of U.S. patent application Ser. No. 14/666,815, filed on Mar. 24, 2015, issued as U.S. Pat. No. 9,888,018 on Feb. 6, 2018, and entitled "CONFIGURATION MANAGEMENT FOR NETWORK ACTIVITY DETECTORS", which is a continuation of U.S. patent application Ser. No. 14/207,382, filed on Mar. 12, 2014, issued as U.S. Pat. No. 9,021,574 on Apr. 28, 2015, and entitled "CONFIGURATION MANAGEMENT FOR NETWORK ACTIVITY DETECTORS", which claims the benefit of U.S. Provisional Application No. 61/778,305, filed on Mar. 12, 2013. The content of these applications is hereby incorporated by reference.

BACKGROUND

1. Field

The present disclosure relates generally to the field of digital security, and more specifically to the configuration management of network activity detectors, including network activity detectors that detect malicious network activities.

2. Description of Related Art

The proliferation of computing and networking technologies has presented challenges in the field of digital security. For instance, one networked computer (i.e., a network node) may spread malicious computer data to other network nodes, and can inflict substantial system disruption across the network thereby causing economic loss.

Conventional digital security technologies include computer logic, generally embodied as "anti-virus programs" and/or "firewalls," that reside at network nodes and that scan for digital security threats such as viruses, malware, worms, Trojan horses, and the like, in computer data. To maintain effective, a conventional digital security solution needs to be configured and managed (e.g., updated) properly. Configuration management of conventional digital security solutions often results in undesirable tradeoffs among efficacy, configurability, and scalability.

For instance, conventional digital securities technologies require updates, such as computer virus signature files, in order to maintain effectiveness against ever-changing digital security threats. The relatively large size of the typical computer virus signature file (i.e., 50 megabytes ("MB") to 300 MB) reduces the scalability of conventional digital security systems in at least two ways. First, large updates utilize significant network bandwidth, and thus limit the number of installations and/or frequency of updates that may be supported by a given network infrastructure. Second, large updates require substantial data processing by a computer processor, and thus limit the types of network nodes that can support installations of conventional digital security technologies to those with sufficient processing power. Therefore, scalability is compromised.

Further, the need to ensure the authenticity of updates also encourages technical implementations in which a few entities (e.g., manufacturers of conventional digital security technology solutions) control the dissemination of updates to many network nodes. The resulting network architecture tend be flat in that many network nodes download updates from A few authorized servers. Such an architecture makes it difficult for an intermediate entity, such as the network administrator of a company, to provide configurations (i.e., updates) that are unique within the company's local network. Therefore, configurability is compromised.

BRIEF SUMMARY

In some embodiments, a system of network activity detectors comprises a first network activity detector, a second network activity detector, and a third network activity detector. The first network activity detector is configured to run on a first network node of a network; send, to the second network activity detector, a first User Datagram Protocol (UDP) network packet, where the first UDP network packet comprises a request for configuration information; and receive, from the second network activity detector, a second UDP network packet, where the second UDP network packet comprises a first configuration information, where the first configuration information includes a set of information for detecting digital security threats.

The second network activity detector is configured to run on a second network node of the network; send, to the third network activity detector, a third UDP network packet, where the third UDP network packet comprises a request for configuration information; receive, from the third network activity detector, a fourth UDP network packet, where the fourth UDP network packet comprises a second configuration information, where the second configuration information includes the set of information for detecting digital security threats; and in response to receiving the first UDP network packet from the first network activity detector, send, to the first network activity detector, the first configuration information, where the first configuration information includes the set of information for detecting digital security threats.

The third network activity detector is configured to run on a third network node of the network; create the set of information for detecting digital security threats; and in response to receiving the third UDP network packet from the second network activity detector, send, to the second network activity detector, the second configuration information, where the second configuration information includes the set of information for detecting digital security threats.

In some embodiments, a network activity detector that is running on a network node comprises a network interface configured to couple with a network; and a processor configured to identify a source of configuration information, wherein the source is an another network activity detector coupled with the network, wherein the configuration information includes a set of information for detecting digital security threats; send, to the source, a request for the configuration information; receive, from the source, the configuration information; and send, to another network activity detector, the configuration information.

DETAILED DESCRIPTION

Figure 1:
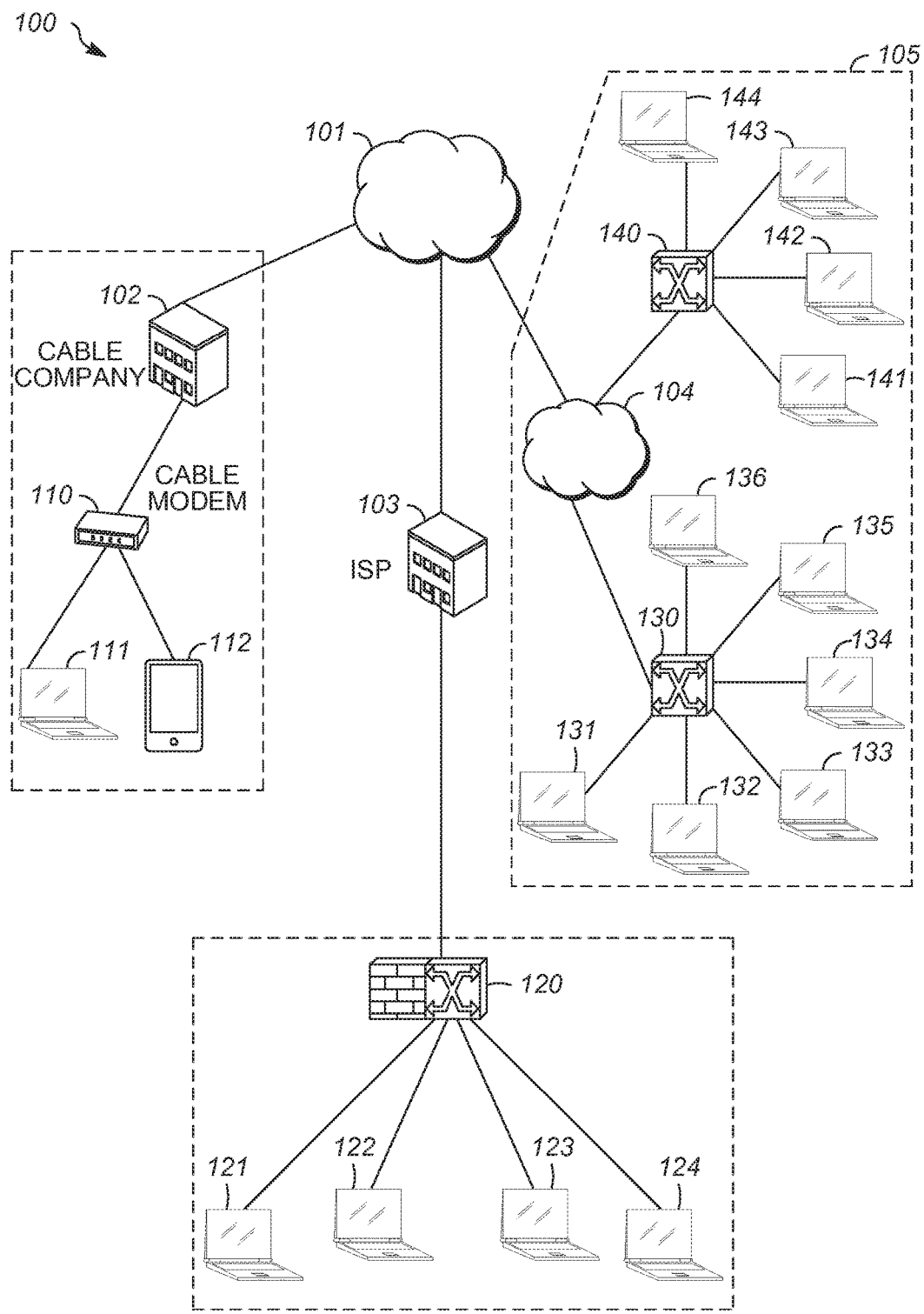
FIG. 1 depicts an exemplary unified threat management system employing network activity detectors.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

The embodiments described herein include devices, techniques, and/or applications for managing the configurations of network activity detectors. A network activity detector resides at a network node and detects network activities of interest, such as digital security threats like computer viruses, malware, worms, Trojan horses, bots, intrusions (e.g., unauthorized access), exploits (e.g., escalation of privileges, violation of confidentiality), timed-based attacks (e.g., Denial of Service), so forth. An exemplary network activity detector is described in U.S. Non-provisional patent application Ser. No. 13/479,222 filed on May 23, 2012, now U.S. Pat. No. 8,347,391, which is incorporated herein by reference for all purposes.

As a preliminary matter, it should be noted that although digital security threats is used as an example of what may be detected as an "activity of interest" by a network activity detector, other activities of interest exist and may also be detected using a network activity detector. Examples of other activities interest may be the transmission of obscene and/or copyrighted materials over a network, among others. Thus, while the examples and embodiments provided below refer to the detection of digital security threats for sake of clarity and consistency, the devices, techniques, and/or applications that are conveyed via the examples and embodiments provided are not limited to the detection of digital security threats only.

Network activity detectors may be implemented into a variety of electronic devices, including desktop computers, laptop computers, tablet computers, phones, routers, firewalls, modems, gateways, and any other suitable electronic devices that support network communications. In some embodiments, a network activity detector is a computer program that runs on a network node. In other embodiments, a network activity detector is part of the electronic circuitry (e.g., application-specific integrated circuitry) of a network node.

The configuration settings of a network activity detector govern the operation of the network activity detector. For instance, the configuration settings of a network activity detector may control the types of digital security threats that are to be detected by the network activity detector. The configuration settings may also control the response of the network activity detector to an intrusion. Given the large number of network activity detectors that may exist in a network, robust mechanisms for managing the configuration settings of multiple network activity detectors are desirable.

1. Overview

FIG. 1 illustrates multiple network activity detectors that form an exemplary system 100 over network 101. The term "Unified Threat Management System" (UTMS) is used for purposes here to refer to a system of network activity detectors such as system 100. Network 101 may be the internet, a private network, a public network, or a combination thereof. UTMS system 100 includes a systems operator 102, which may be, e.g., a television cable company. UTMS system 100 also includes another systems operator 103, which may be, e.g., an internet service provider. A portion of UTMS system 100 is an enterprise network 104.

Systems operator 102 provides network access to network nodes 110-112, which may (but need not) be physically adjacent, via an integrated modem router 110. Network node 111 is a laptop computer and computing device 112 is a tablet computer. Systems operator 103 provides network access to network nodes 120-124, which may (but need not) be located within at a small business company. Network node 120 is a router and is connected to network 101 and to computing devices 121-124. Enterprise network 104 is an enterprise network infrastructure that provides network access to network nodes 130-136 and 140-144, which may (but need not) be located at geographically separate offices of a large business company 105. Network nodes 130 and 140 are routers connected to enterprise network 104 and serve computing devices 131-136 and 141-144, respectively.

One or more of network nodes 110-112, 120-124, 130-136, and 140-144 in UTMS system 100 can each embody a network activity detector. UTMS system 100 thus highlights the need for the robust configuration management of network activity detectors that are spread across a UTMS system. Consider, for instance, that systems operator 102 may wish to manage the configuration of downstream network activity detectors in its downstream network, and large business company 105 may wish to maintain distinct configuration settings for network activity detectors in different parts of its network infrastructure.

2. Configuration Settings

Figure 2:
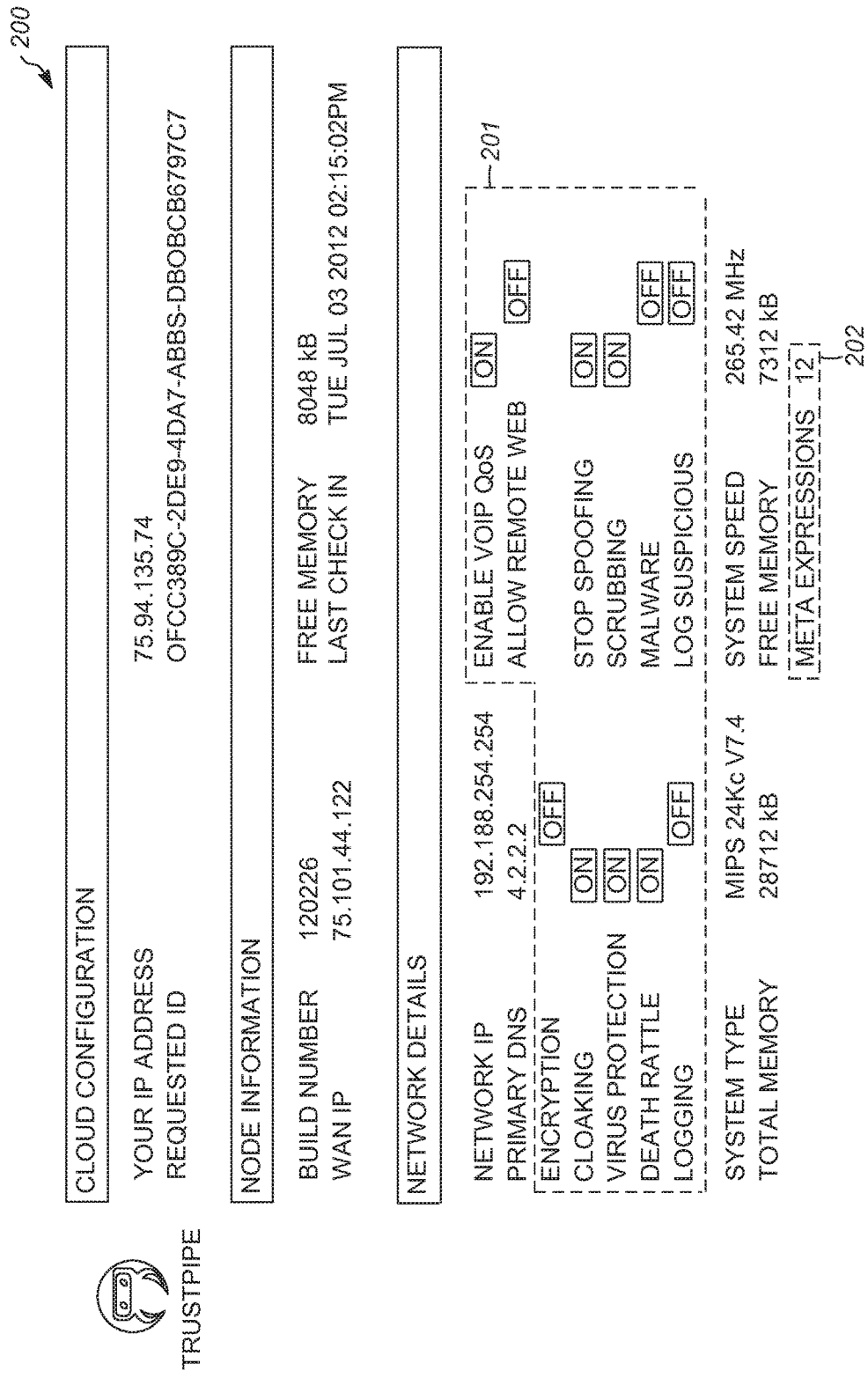
FIG. 2 depicts exemplary configuration settings for network activity detectors.

As discussed above, the configuration settings of a network activity detector govern the operation of the network activity detector. FIG. 2 illustrates exemplary configuration settings 201 of a network activity detector. As shown, configuration settings 201 include the settings of, e.g., enabling or disabling virus detection by a network activity detector, specifying whether a network activity detector should cloak (i.e., hide) a network node when a digital security threat is detected, and the like.

Configuration settings 201 also include information 202 regarding the meta-expressions that are used by the network activity detector to detect specific network activities. As described in U.S. Non-provisional patent application Ser. No. 13/479,222 filed on May 23, 2012, incorporated herein by reference for all purposes, meta-expressions are used by a network activity detector to detect network activities of interest. Put another way, the specific digital security threats that are to be detected by a network activity detector may be governed by the meta-expressions being used by the network activity detector. Also, as described in U.S. Non-provisional patent application Ser. No. 13/479,222, it has been determined that only a handful of meta-expressions are necessary to detect all known digital security threats and their variants (even if the variants are unknown), which total over 2.5 million in number. As shown in FIG. 2, the configuration settings of the exemplary network activity detector includes twelve meta-expressions for this purpose.

In some embodiments, a web-based user interface, such as webpage 200, is presented by the network activity detector so that a user can change the configuration settings of the network activity detector. In some embodiments, it is possible for a network activity detector to receive configuration settings programmatically over a network from other network activity detectors. That is, configuration settings that are received by a network activity detector over a network can be implemented into the network activity detector without requiring user intervention. The received configuration settings can include one or more settings shown on webpage 200 and meta-expressions for detecting digital security threats.

Figure 3:
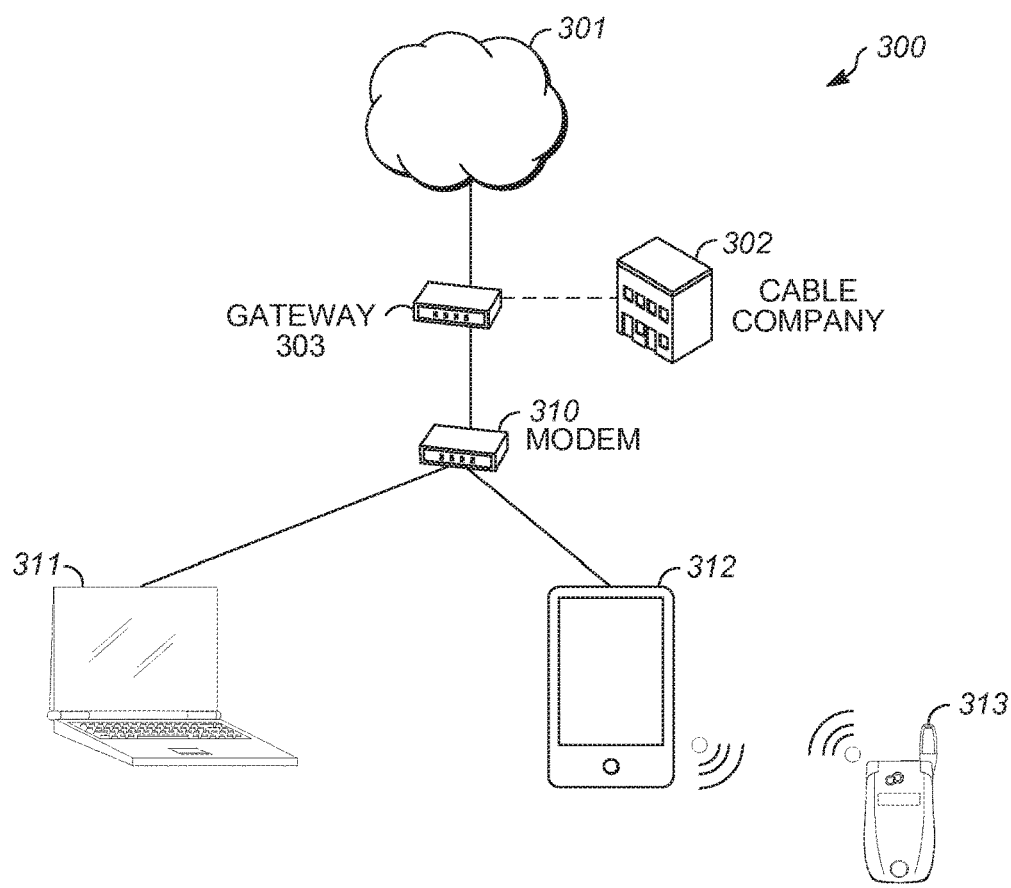
FIG. 3 depicts an exemplary unified threat management system employing network activity detectors.

Exemplary transmissions of configuration settings between network activity detectors are discussed with reference to FIG. 3. In FIG. 3, UTMS system 300 includes systems operator 302, which controls network gateway 303 connected to network 301. Gateway 303 provides network access to network nodes 311 and 312 by way of modem 310. Network nodes 311 and 312 are a laptop computer and a tablet computer, respectively. Modem 310, laptop computer 311, and tablet computer 312 each embodies a network activity detector. For example, a network activity detector is implemented into the chipset of modem 310 and another is implemented into the operating system kernel of tablet computer 312. Also, a network activity detector is installed as an application program into the operating system of laptop computer 311.

An exemplary transmission of configuration settings between network activity detectors is now discussed with reference to network nodes 310 and 311 of FIG. 3. During start-up, the network activity detector of laptop computer 311 sends a request for configuration settings to a designated network activity detector. The designated network activity detector can be any other network activity detector, e.g., a network activity detector that is running on a different network node like modem 310. In response to the request from the network activity detector of laptop computer 311, the network activity detector of modem 310 sends a set of configuration settings, via network, to laptop computer 311. Upon receiving the configuration settings, the network activity detector of laptop computer 311 implements the received configuration settings. In addition, the network activity detector of laptop computer 311 may begin to operate based on the configuration settings.

Another exemplary transmission of configuration settings between network activity detectors is now discussed with reference to network nodes 310 and 312 of FIG. 3. During start-up, the network activity detector of tablet computer 312 sends a request for configuration settings to a network activity detector that is running on modem 310. In response to the request, the network activity detector of modem 310 sends a set of configuration settings to tablet computer 312, which are then implemented and used by the network activity detector of tablet computer 312.

Notably, the configuration settings that are sent by the network activity detector of modem 310 to laptop computer 311 and to tablet computer 312 may be similar, identical, or identical in part. By sending configuration settings that are consistent (meaning that the configuration settings are at least identical in part), the network activity detector of modem 310 ensures that its downstream network activity detectors (i.e., those of laptop computer 311 and tablet computer 312) are operating based on consistent configuration settings. In this way, modem 310 may ensure that the network activity detectors of laptop computer 311 and tablet computer 312 are able to detect the same digital security threats and are configured to respond to detected digital security threats in the same manner.

Yet another exemplary transmission of configuration settings between network activity detectors is now discussed with reference to gateway 303 and modem 310 of FIG. 3. Gateway 303 is operated by systems operator 302 that provides internet networking services, meaning that gateway 303 acts as a conduit of network traffic between network 301 and the customers of systems operator 302. It is thus desirable for systems operator 302 to minimize digital security threats that pass through gateway 303.

One way in which systems operator 302 can help prevent the transmission of digital security threats via its infrastructure (e.g., gateway 303) is by controlling the configuration settings of network activity detectors that are downstream from its infrastructure. Systems operator 302 may do so by, e.g., sending configuration settings to network activity detectors that run on downstream devices.

In the present example, the network activity detector of modem 310 is configured to, during start-up, request configuration settings from the network activity detector of gateway 303. In response to the request, the network activity detector of gateway 303 sends a set of configuration settings to modem 310. The received configuration settings are implemented by modem 310. Since, as discussed above, the network activity detector of modem 310 is responsible for sending configuration settings to downstream network nodes 311 and 312, modem 310 can provide configuration settings—that are consistent with those received from gateway 303—to network nodes 311 and 312. In this way, systems operator 302 (which controls gateway 303) may ensure that the network activity detectors of modem 310, laptop computer 311, and tablet computer 312 are able to detect the same digital security threats and are configured to respond to detected digital security threats in a consistent manner.

It should be noted that, while the network activity detector of gateway 303 is primarily responsible for controlling the configuration settings of other network activity detectors in UTMS system 300, it is possible for other network activity detectors of UTMS system 300 (i.e., those running on network nodes 310-312) to become senders of configuration settings, if necessary. That is, any one (or more) network activity detectors of UTMS system 300 can be configured to provide configuration settings to other network activity detectors.

The ability of a network activity detector to receive, and to provide, when needed, configuration settings to other network activity detectors significantly increases the scalability of a UTMS system. For example, should tablet computer 312 of UTMS system 300 become configured to act as a mobile wireless access hotspot for cellular phone 313 to access network 301, the network activity detector of tablet computer 312 can provide configuration settings to a network activity detector that is running on cellular phone 313. In this way, UTMS system 300 can scale to accommodate new network activity detectors that come online in a UTMS system.

Further, a network activity detector can provide configuration settings that are consistent with or different from the configuration settings that are received by the network activity detector. That is to say, the configuration settings that are sent, e.g., by tablet computer 312 to cellular phone 313 can be consistent with or can be different from the configuration settings that are used by tablet computer 312. In this way, subsets of network nodes in a UTMS system can have network activity detectors that operate with different configurations settings, thereby improving the configurability of the UTMS system.

In some instances, the appropriate configuration settings to be sent to the network activity detector of cellular phone 313 is a set that is consistent with the configuration settings imposed by systems operator 302 by way of gateway 303. In some instances, the appropriate configuration settings to be sent to the network activity detector of cellular phone 313 are a set of more restrictive configuration settings as compared with the configuration settings from gateway 303. The provision of more restrictive configuration settings further reduces the chance of cellular phone 313 becoming compromised by a digital security threat. By the same token, the provision also further reduces the chance of tablet computer 312 becoming comprised by a digital security threat that originates from cellular phone 313. The latter result is especially important for a device such as tablet computer 312 that allows tethering.

In some embodiments, whether a network activity detector provides configuration settings to other network activity detectors is determined based the mode of operation of the network activity detector. In a first mode of operation, which may be referred to as a "super" mode, a network activity detector can send configuration settings to other network activity detectors. For purposes of this disclosure, a network activity detector that is operating in "super" mode is referred to as a super network activity detector, and a network node having a super network activity detector is referred to as a "super network node." A super network activity detector sends configuration settings to a downstream network activity detector when a request for configuration settings is received from the downstream network activity detector.

In a second mode of operation, which may be referred to as a "standard" mode, a network activity detector is not configured to send configuration settings to other network activity detectors. For purposes of this disclosure, a network activity detector that is operating in "standard" mode is referred to as a standard network activity detector, and a network node having a standard network activity detector that is operating in "standard" mode is referred to as a "standard network node," or simply a "network node."

In some embodiments, the mode of operation is managed via a configuration setting at a network activity detector. The mode of operation of such a network activity detector is thus switched by changing its configuration settings. In some embodiments, the mode of operation switches automatically (e.g., programmatically). For instance, a network activity detector may programmatically switch to super mode when a request for configuration settings is received.

Regardless of operation mode, a network activity detector may request configuration settings from a super network activity detector. When a network activity detector receives configuration settings from a super network activity detector, the configuration settings are processed and used by the receiving network activity detector. As discussed above, an important aspect of configuration settings is the inclusion of meta-expressions, which can be used by the receiving network activity detector to detect digital security threats. Put another way, a super network activity detector can itself request for configuration settings from another super network activity detector.

Figure 4:
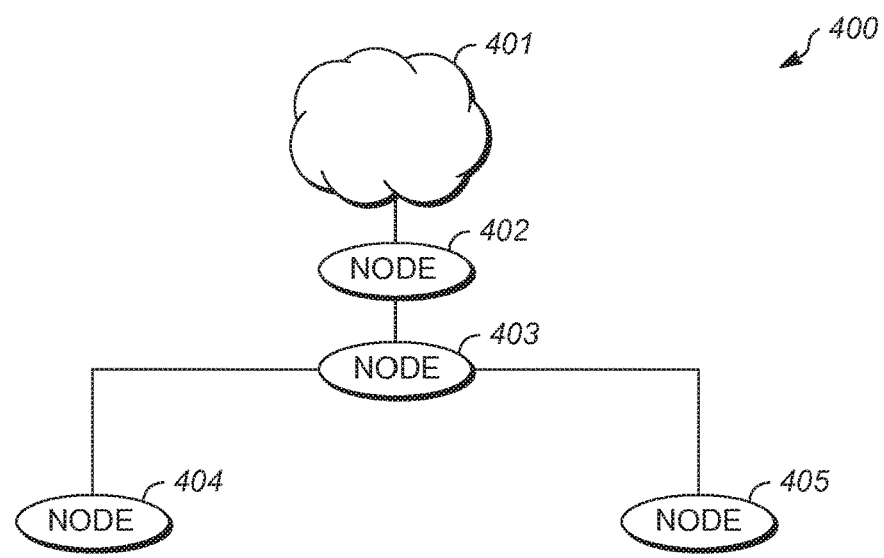
FIG. 4 depicts an exemplary unified threat management system employing network activity detectors.

An exemplary implementation of network activity detectors is now discussed with respect to FIG. 4. In FIG. 4, network nodes 402-405 are connected directly or indirectly to network 401 and form a UTMS system 400. In some embodiments, network nodes 402, 403, 404, and 405 correspond to gateway 303, modem 310, laptop computer 311, and tablet computer 312 illustrated in FIG. 3. Each of network nodes 402-405 embodies a network activity detector.

Network nodes 404 and 405 are standard nodes, meaning they are not configured to provide configuration settings to other network activity detectors. In contrast, super network node 402 does embody a super network activity detector that is configured to provide configuration settings to other network activity detectors, such as those in UTMS system 400. Further, super network node 403 embodies a super network activity detector that receives configuration settings from super network node 402 and that is configured to relay at least portions of the received configuration settings to the network activity detectors of standard network nodes 404 and 405. Thus, super network node 402 controls the configuration settings of downstream network nodes 403-405.

Figure 5:
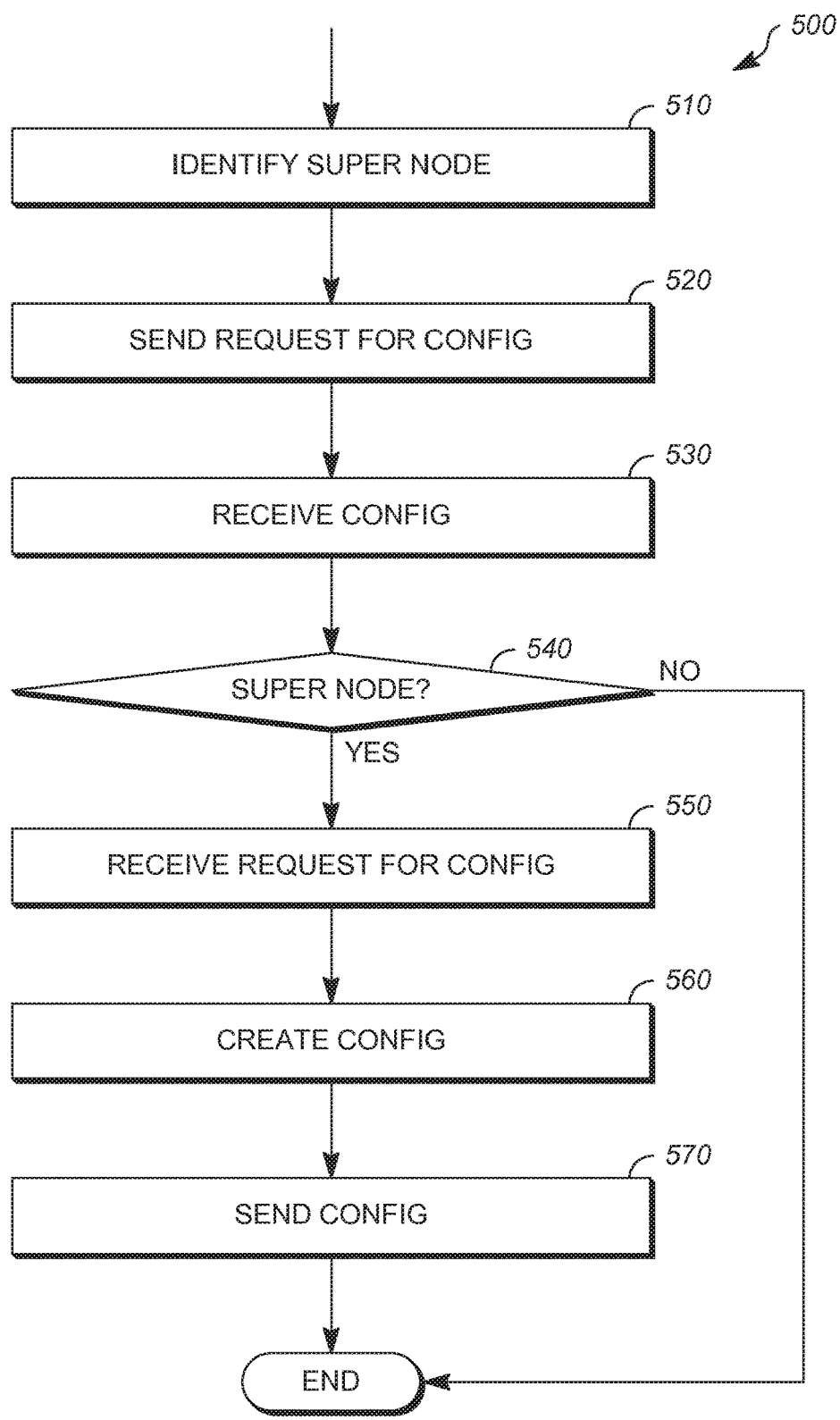
FIG. 5 is a block diagram depicting an exemplary process for managing configuration settings by network activity detectors.

FIG. 5 illustrates exemplary process 500 which may be performed by a network activity detector to participate in a UTMS system as described above. In some embodiments, process 500 is performed by one or more of the network activity detectors of network nodes 402-405 (FIG. 4). At block 510, the network activity detector that is carrying out process 500 (referred to as the "local network activity detector") identifies a super network activity detector to which it is to send a request for configuration settings.

In some embodiments, the identity of the super network activity detector is managed via a configuration setting at the local network activity detector. The configuration setting may have been previously obtained by the local network activity detector or may have been previously stored into the local network activity detector by way of a suitable mechanism, such as during a computer program installation process. In some embodiments, the identity of the super network activity detector is hardcoded into the computer-executable instructions of the local network activity detector. The identity of the super network activity detector node can be a null value, because it is possible for a network activity detector to not request configuration settings from another network activity detector. Such a network activity detector could produce its own configuration settings based on user input, creation of meta-expressions as described in U.S. Non-provisional patent application Ser. No. 13/479,222 filed on May 23, 2012, or other suitable configuration processes.

At block 520, the local network activity detector sends a request for configuration settings to the super network activity detector identified at block 510. In some embodiments, requests for configuration settings are sent using User Datagram Protocol (UDP) datagrams. UDP datagrams are used because UDP introduces relatively low overhead as compared to other transport protocols. Also, because UDP is stateless, its use reduces the amount processor power required that is to track UDP traffic at a network activity detector. The stateless nature of UDP is such that if an initial UDP datagram (representing a request for configuration settings) is dropped en route to its destination network node, the sending of a subsequent UDP datagram makes up for the dropped UDP datagram. Even though it would not be aware of the dropped UDP datagram, when the super network activity detector at the destination network node finally receives the subsequent UDP datagram, it would provide the most up-to-date configuration settings. Those configuration settings would leapfrog any intermediate configuration settings, if any, that were missed due to the dropped UDP datagram. Despite the benefits provided by a stateless transport layer protocol (such as UDP), it should be noted that communication between network activity detectors can, alternatively, utilize a different network transport layer protocol. For example, in some embodiments, requests for configuration settings and/or configuration settings can be sent using Transmission Control Protocol (TCP) datagrams, even though TCP communications are considered stateful.

In some embodiments, block 520 is performed at timed intervals so that the local network activity detector requests configuration settings from time to time. The duration of the timed interval generally depends on the size of network packets that are used for updating configuration settings and the processing overhead that are required. In some embodiments, the timed interval is a predetermined interval of between one to five minutes. In some embodiments, the timed interval changes based on processor load on the local network activity detector.

At block 530, the local network activity detector receives configuration settings from a super network activity detector and begins to operate based on the received configuration settings. The received configuration settings can include meta-expressions that are used by the local network activity detector to detect digital security threats. At block 540, the local network activity detector determines whether it is operating in super mode. If the network activity detector is operating in super mode, processing proceeds to block 550. Otherwise, processing ends. At block 550, the local network activity detector receives a request for configuration settings from another network activity detector. At block 560, the local network activity detector creates a set of configuration settings. The created configuration settings can include meta-expressions for detecting digital security threats. At block 570, the local network activity detector sends the created configuration settings to the requesting network activity detector.

3. Helixing

Figure 6A:
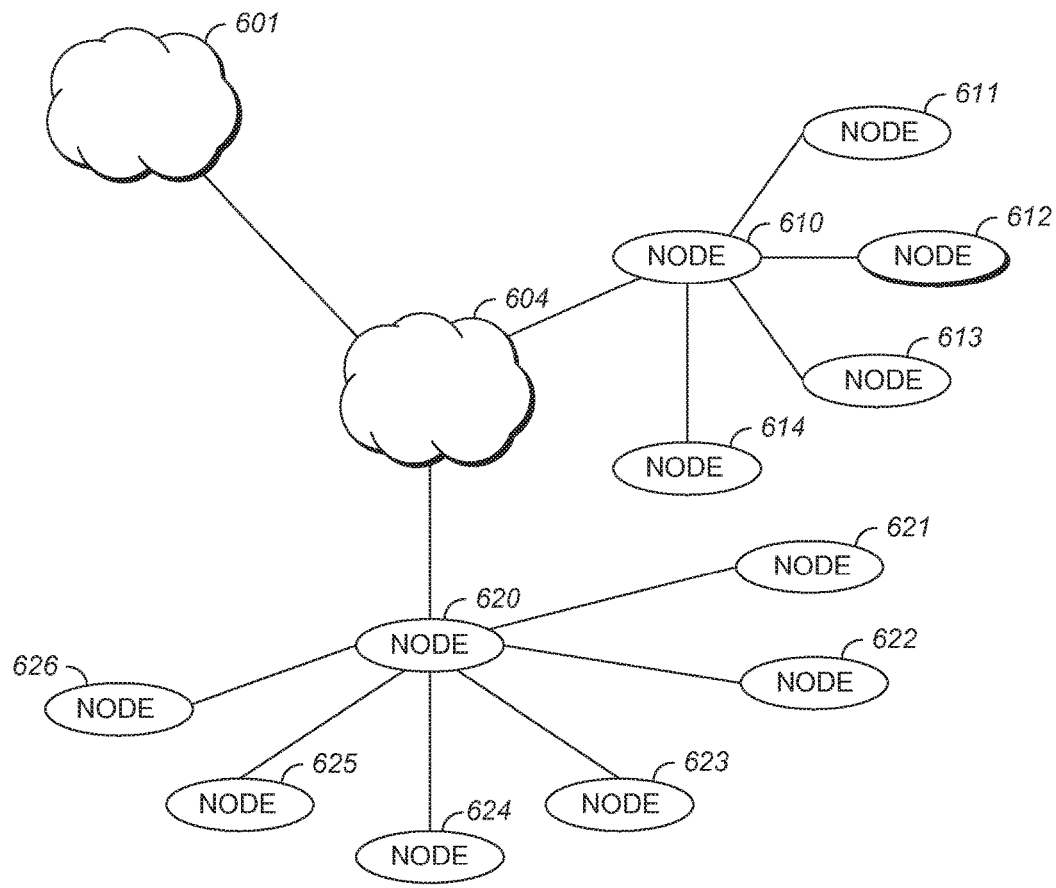
FIGS. 6A-6B depict an exemplary unified threat management system employing network activity detectors.
Figure 6B:
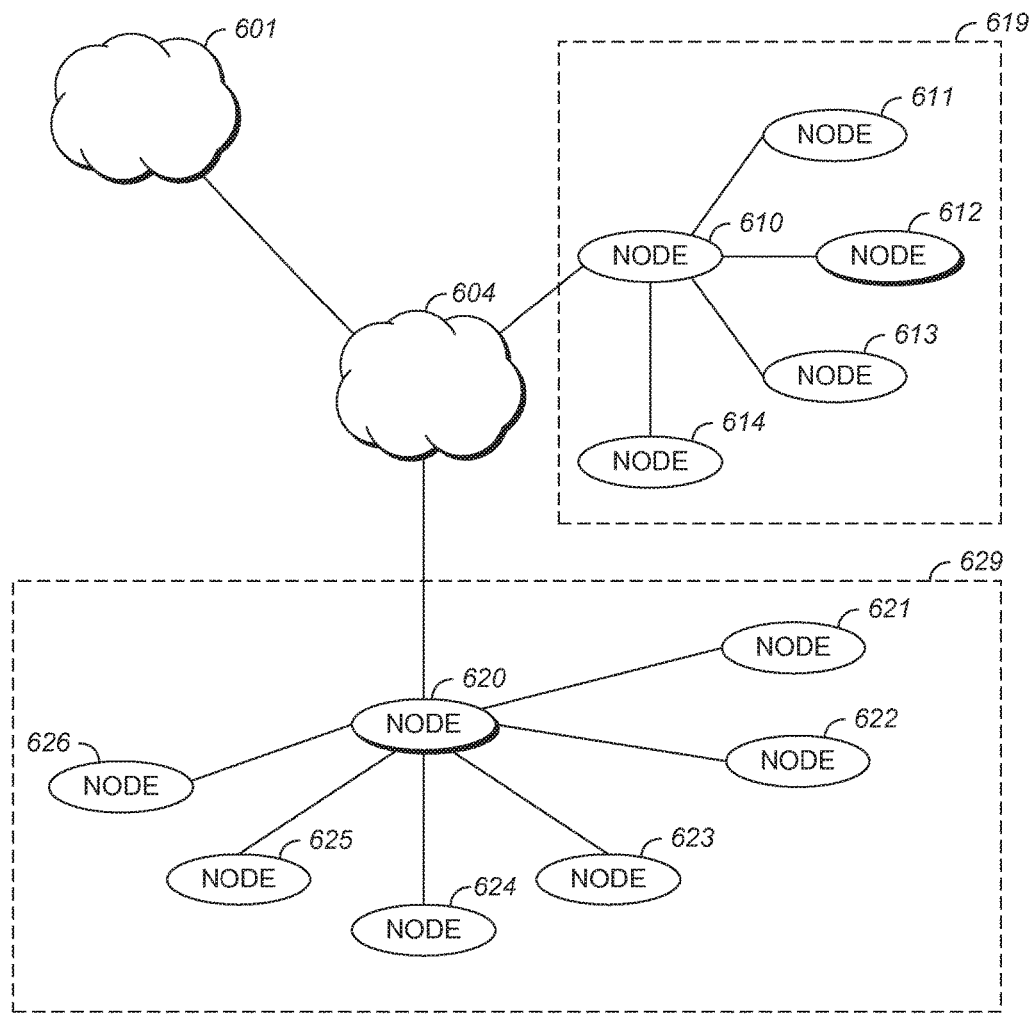

Another exemplary implementation of network activity detectors is now discussed with respect to FIG. 6A-6B. In FIG. 6, network nodes 610-614 and 620-626 are connected directly or indirectly to network 601 and form a UTMS system 600. In some embodiments, network nodes 610-614 and 620-626 correspond to the network nodes of large business company 105 (FIG. 1).

Super network node 612 embodies a super network activity detector that provides configuration settings to the other network nodes of UTMS system 600, i.e., network nodes 610-614 and 620-626. Depending on the processing capabilities of super network node 612 and the processing load caused by other running processes, super network node 612 may experience high levels of processor load that comprise its ability to perform as a super network node. For instance, under high processor load, the super network activity detector of super network node 612 may not keep up with incoming requests for configuration settings. When this occurs, it would be desirable for the super network activity detector of super network node 612 to scale back its responsibilities to maintain the integrity of UTMS system 600.

One way in which the super network activity detector of super network node 612 can scale back its responsibilities is to offload some of its configuration management processes to other network activity detectors within UTMS system 600. In some embodiments, this is done via a "helixing" process. The helixing process increases the number of super network nodes within a UTMS system and spreads out requests for configuration settings to those additional super network nodes.

More specifically, the super network activity detector of super network node 612 can initiate the helixing process by identifying another target network activity detector within UTMS system 600 that can help respond to requests for configuration settings. The super network activity detector of super network node 612 is aware of the existence of other network activity detectors in UTMS system 600 because, as a super network activity detector, it has previously received requests for configuration settings from other network activity detectors in UTMS system 600. For instance, the super network activity detector of super network node 612 receives requests for configuration settings from the network activity detectors of network nodes 610, 611, 613, 614 and 620-626. As such, the super network activity detector of super network node 612 is aware of their existence, and can therefore identify one (or more) of these network activity detectors as a target network activity detector.

A network activity detector need not be operating in super mode in order to be identified as a target, because the targeting super network activity detector can instruct the targeted network activity detector to switch to super mode, if necessary. For instance, the super network activity detector of super network node 612 can instruct the target network activity detector of network node 620 to operate in super mode, if the target network activity detector is not operating in standard mode, by sending appropriate configuration settings to the target network activity detector of network node 620. In response, the network activity detector of network node 620 begins to operate in super mode. FIG. 6B illustrates network node 620 as a super network node.

The super network activity detector of super network node 612 continues the helixing process by instructing other network activity detectors in UTMS system 600 to request for configuration settings from the network activity detector of network node 620, which is now operating in super mode. For instance, when the super network activity detector of super network node 612 receives requests for configuration settings from the network activity detectors of network nodes 621-626, it responds by sending configuration settings that instruct requesting network activity detector(s) to, in the future, request for configuration settings from the super network activity detector of super node 620. In this way, super network node 612 offloads at least a part of its responsibility to provide configuration settings to super network node 620, thereby transferring some processing load from itself to super network node 620, and ensuring that configuration settings are transmitted as necessary to maintain the integrity of UTMS system 600.

Notably, while network nodes that are visually arranged in FIG. 6B such that super network nodes 612 and 620 serve a number of adjacent network nodes in network portions 619 and 629, respectively, there is no requirement for physical proximity between a super network node and a standard network node. That is to say, e.g., the network activity detector of standard network node 626 can request configuration settings from the network activity detector of super network node 612, regardless of whether the two network nodes are physically proximate.

Figure 7:
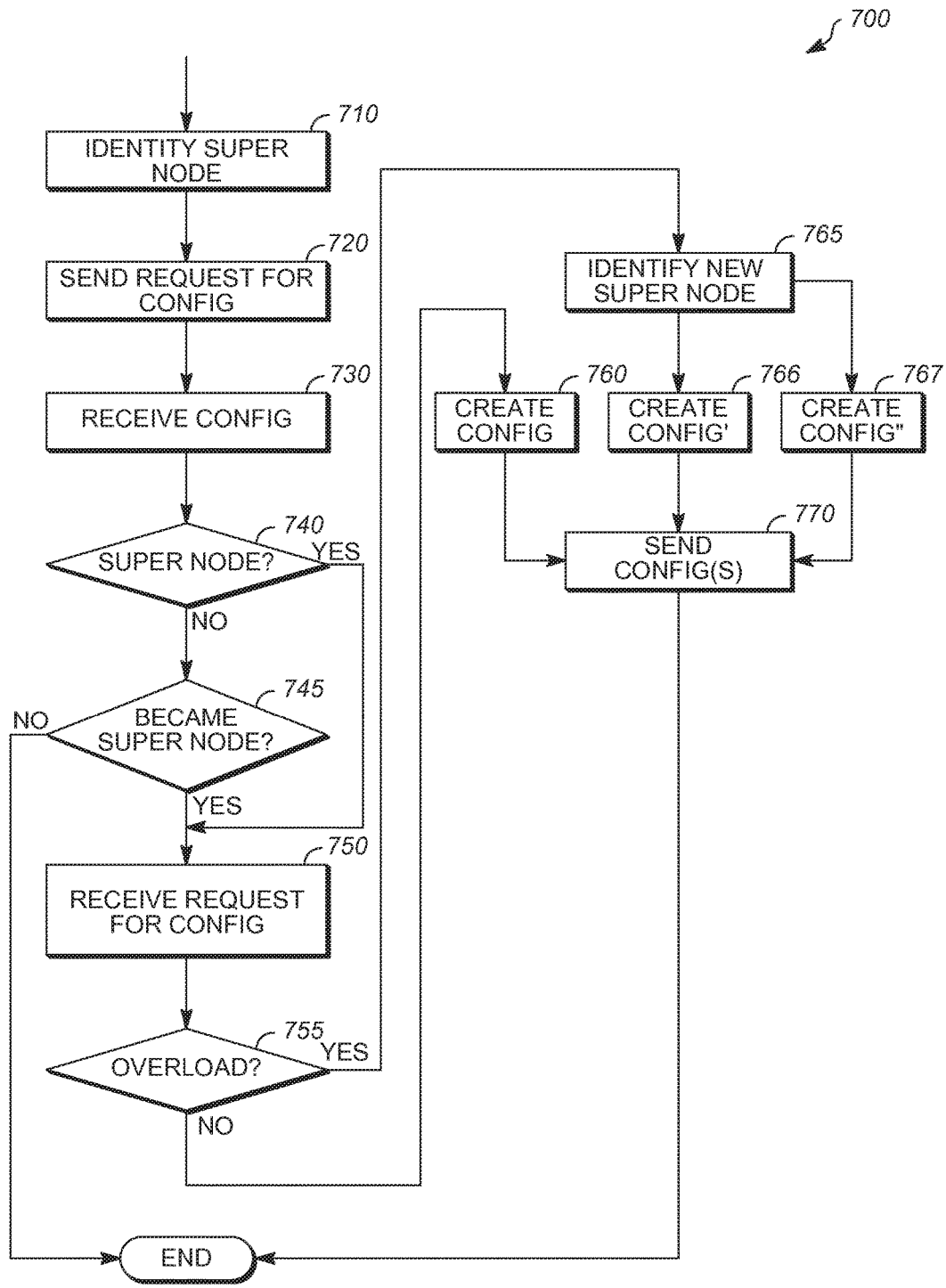
FIG. 7 is a block diagram depicting an exemplary process for managing configuration settings by network activity detectors.

FIG. 7 illustrates exemplary process 700 which may be performed by a network activity detector to perform the above-described helixing process. Process 700 can be performed by one or more network activity detectors of a UTMS system. In some embodiments, process 700 is performed by the network activity detectors of network nodes 612 and 620 (FIGS. 6A-6B).

At block 710, the network activity detector that is carrying out process 700 (referred to as the "local network activity detector") identifies a super network activity detector to which it is to send a request for configuration settings. At block 720, the local network activity detector sends a request to the identified super network activity detector. At block 730, the local network activity detector receives configuration settings from the identified super network activity detector and begins to operate based on the received configuration settings. At block 740, the local network activity detector determines whether it is operating in "super" mode. If the local network activity detector is operating in "super" mode, processing proceeds to block 750. Otherwise, processing continues to block 745.

At block 745, the local network activity detector reviews the received configuration settings to determine if they include an instruction for the local network activity detector to operate in "super" mode. If the received configuration settings include such an instruction, processing proceeds to block 750. Otherwise, processing ends.

At block 750, the local network activity detector receives a request for configuration settings from another network activity detector. At block 755, the local network activity detector determines whether it is experiencing high levels of processor load. For instance, a processor load of 85% utilization, on average over a 24-hour period may be considered a high level of processor load.

If the local network activity detector is experiencing high processor load, processing proceeds to block 765. At block 765, the local network activity detector identifies a target network activity detector based on previously received requests for configuration information. At block 766, the local network activity detector creates configuration settings that, among other things, instruct the target network activity detector to operate in super mode. In addition, at block 767, the local network activity detector creates configuration settings that, among other things, instruct a receiving network activity detector to request configuration settings from the target network activity detector, in the future.

If the local network activity detector is not experiencing high processor load, processing proceeds to block 760. At block 760, the local network activity creates configuration settings. In contrast to the configuration settings created at block 766, the configuration settings created at block 760 do not instruct a receiving network activities detector to switch to "super" mode. Also, in contrast the configuration settings created at block 767, the configuration settings created at block 760 do not instruct a receiving network activities detector to request for configuration settings from another super network activity detector in the future. At block 770, the configuration setting(s) created at blocks 760, 766, and/or 767 (which are created in response to the request for configuration settings received at block 750) are sent by the local network activity detector to the requesting network activity detector. Processing ends after block 770.

4. Encryption

Configuration settings can be encrypted to improve the integrity of a UTMS system. Configuration settings can be encrypted during transmission between network nodes. It is desirable for encrypted configuration settings to be difficult to decrypt without valid decryption credentials so that configuration settings cannot be recognized as such during transmission. Configuration settings can also be encrypted while they reside at a network node. An encryption mechanism would be futile if configuration settings are compromised while in decrypted form.

In some embodiments, configuration settings are encrypted using an encryption mechanism that utilizes local operating parameters of an individual network activity detector that cannot be easily identified outside the operating environments of the network activity detector. Put another way, the encryption mechanism encrypts, at least in part, based on local operating parameters of an operating environment.

By way of background, various asymmetric key algorithms and symmetric key encryption algorithms generate encryption keys and decryption keys based on a number. In asymmetric key algorithms, the number is used to generate complementary public and private keys. In symmetric key algorithms, the number is used to generate a shared key. In this context, a number of high entropy is preferred because the uncertainty between the digits of the number decreases the possibility of reverse-engineering the number (and thereby obtaining the necessary key for decryption). A number such as "11112222" has low entropy and is not preferred for generating cryptography keys because the digits of "11112222" are somewhat predictable. One of ordinary skill in the art would recognize that a number of high entropy is often referred to as a "random" number in the art because the digits of such a number appear random.

In some embodiments, configuration settings are encrypted based on a random number that is in turn based on: (1) a unique identifier ("UID") of a network node, (2) the UID of a processor of the network node, and/or (3) the UID of a process that is running on the processor of the network node. The UID of a network node can be, e.g., the MAC address that is reported by the network node. The UID of a processor can be, e.g., the serial number of a central processing unit ("CPU") that may be accessed through software instructions such as processor operation code instructions (also referred to as "opcodes"). The UID of a process can be, e.g., an operating environment process identifier (also referred to as "PIDs"). UIDs can be combined by way of mathematical or logical operations (e.g., mathematical addition, logical addition) to form a string that is then given as input to a hash function (e.g., Message-Digest Algorithm, Secure Hash Algorithm) to produce a number having high entropy for use in an encryption algorithm.

Figure 8:
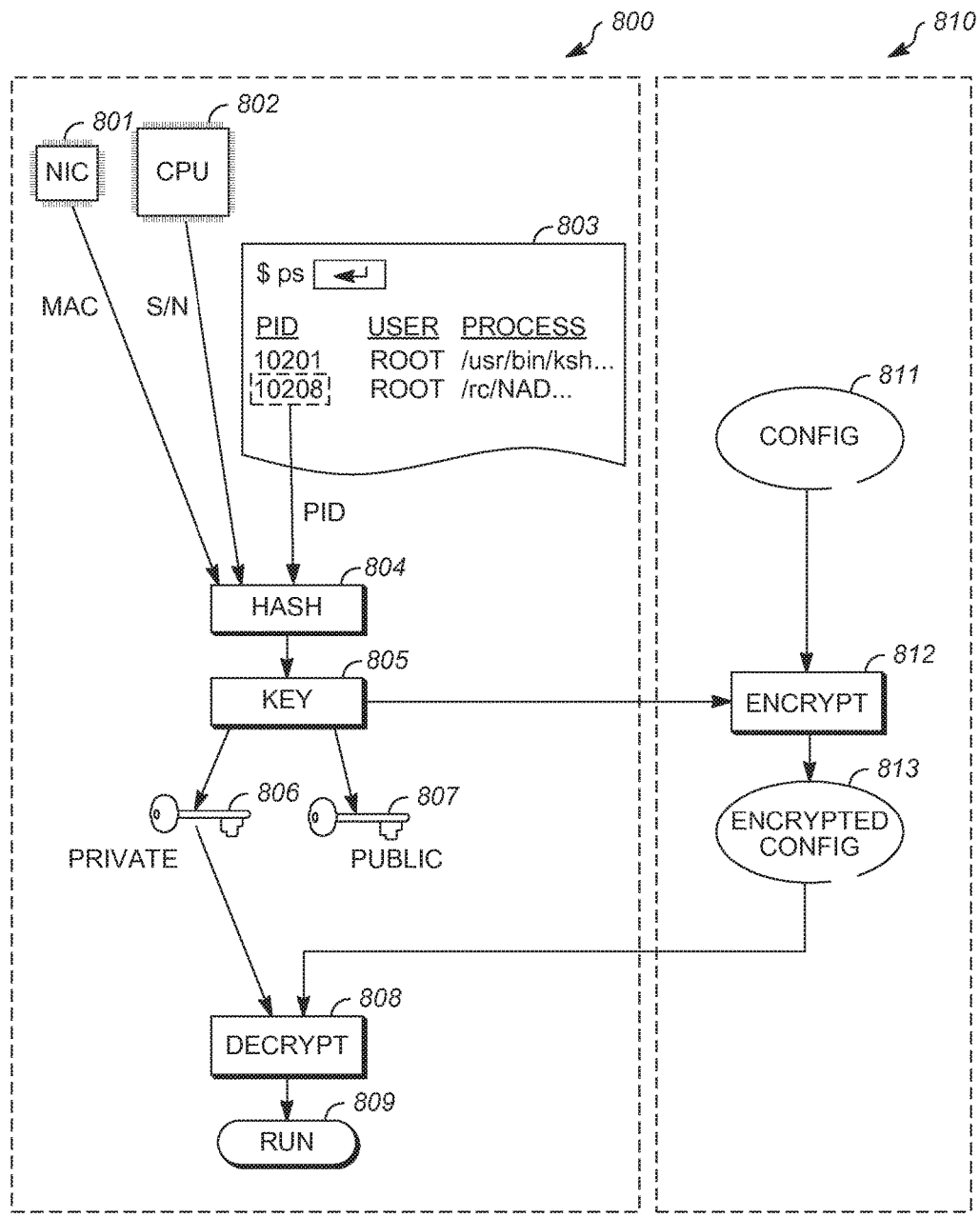
FIG. 8 depicts an exemplary performance of an encryption process.

The use of UIDs for encrypting configuration settings is further described with reference to FIG. 8, which depicts a standard network node 800 and a super network node 810. Standard network node 800 includes network interface 801 and CPU 802, and operates under an operating environment that provides shell 803. Network interface 801 provides MAC address information. CPU 802 provides serial number information. Shell 803 provides PID information regarding processes that are running on standard network node 800. The foregoing PID information is provided to a hash function 804, which computes a number having high entropy that is then provided to key generator function 805, which computes a private key 806 and a public key 807 for purposes of encrypting configuration settings that reside at and/or that are sent to standard network node 800. Standard network node 800 makes public key 807 available to other network nodes, e.g., by including public key 807 in requests for configuration settings that are sent to super network activity detectors. Super network node 810 uses encryption function 812 and public key 807 to encrypt configuration settings 813 that are then sent to standard network node 800.

Configuration settings 813, once received by standard network node 800, can remain encrypted until their contents (e.g., meta-expressions) are needed to carry out processes for detecting digital security threats. When needed, configuration settings 813 are loaded into processor memory and provided to decryption function 808 so that standard network 800 can operate based on the configuration settings.

Figure 9:
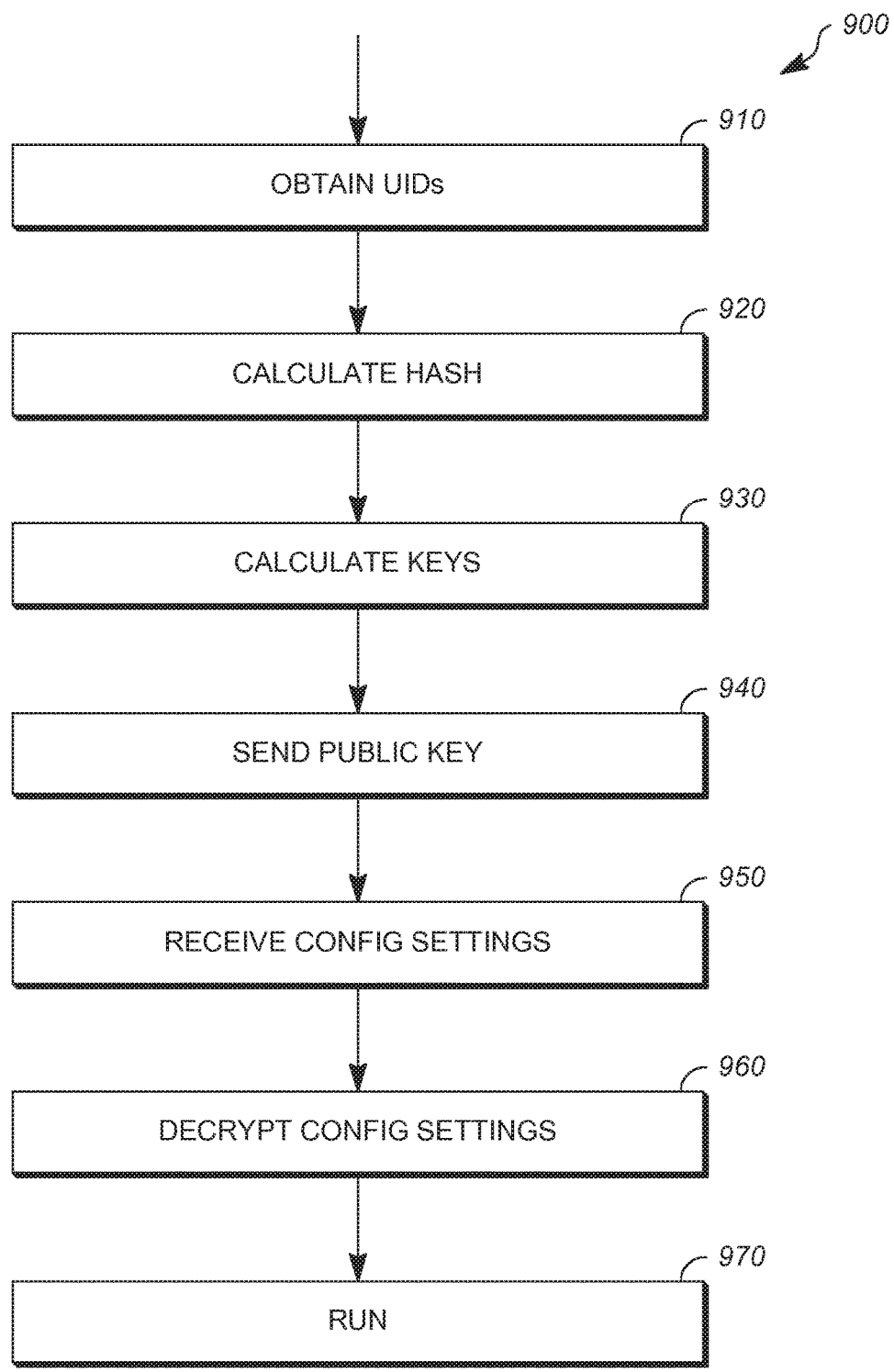
FIG. 9 is a block diagram depicting an exemplary encryption process.

FIG. 9 illustrates exemplary process 900 which may be performed by a network activity detector at a network node to carry out the above-described encryption techniques. At block 910, the network activity detector that is carrying out process 900 (referred to as the "local network activity detector") obtains one or more UIDs. The obtained UIDs may include a MAC ID, a CPU serial number, and/or a PID. At block 920, the obtained UIDs are combined and a hash function is used to produce a number having high entropy based on the UIDs. At block 930, one or more keys are calculated based on the hash number. The keys may be a private key, a public key, and/or a shared key. At block 940, one of keys obtained at block 930 is sent to a super network activity detector. At block 950, configuration settings that have been encrypted using the same key are received by the local network activity detector. At block 960, the local network activity detector decrypts the received configuration settings using one of the keys obtained at block 930. At block 970, the decrypted configuration settings are used by the local network activity detector to detect network digital security threats.

Process 900 is desirable for at least three reasons. First, the number that is obtained based on the above-described UIDs has high entropy (even before the application of a hash function), and is thus a good random number for purposes of encryption. For instance, MAC addresses are intended to be universally unique. Second, the number is difficult to reverse-engineer because it is difficult to identify (e.g., reverse-engineer) a CPU serial number without physical or low-level access to a CPU, and because it is difficult to predict the PID number of a running processes. Third, the decrypted output of block 960, which is a set of configuration settings that includes meta-expressions for detecting digital security threats, can reside within processor memory. Unlike larger signature files, meta-expressions (which typically total less than 1 kilobyte in size) can reside completely within the internal memory of many modern processors without needing to be stored in external memory locations during operation. As one of ordinary skill in the art would recognize, it would be difficult to obtain the decrypted meta-expressions (and/or other configuration settings) from the internal memory of a CPU without physical or low-level access (e.g., debug mode) to the CPU, both of which would be difficult for a malicious entity to achieve in a typical network-based attack.

Figure 10:
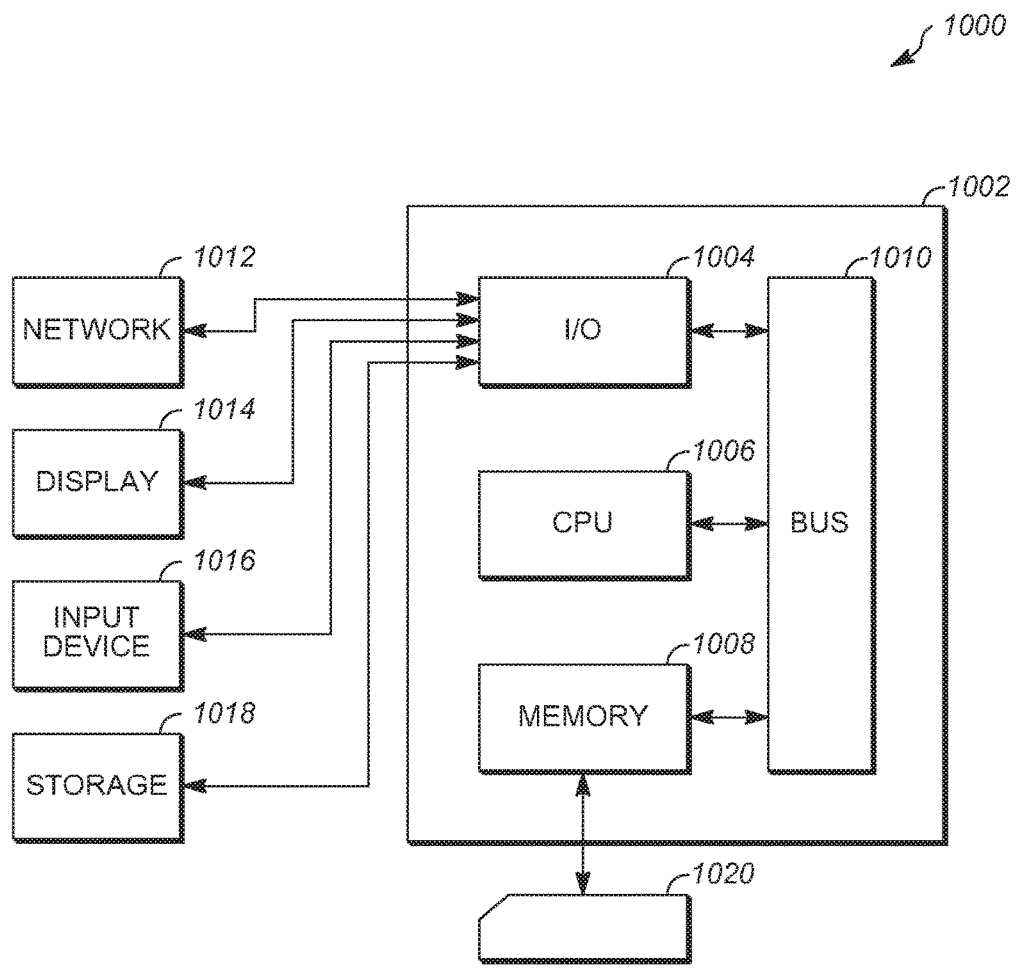
FIG. 10 depicts an exemplary computing system.

Portions of the above-described processes may be implemented in exemplary computing system 1000 illustrated in FIG. 10. In some embodiments, computing system 1000 is a network device, such as a router, gateway, and a firewall, or the like. In some embodiments, computing system 1000 is a gateway device, such as a modem, or the like. In some embodiments, computing system 1000 is a mobile device, such as a desktop computer, a laptop computer, a cellular phone, a tablet, or the like. In some embodiments, computing system 1000 is a network interface "card."

As shown in FIG. 10, the computing system 1000 includes a computer motherboard 1002 with bus 1010 that connects I/O section 1004, one or more central processing units (CPU) 1006, and a memory section 1008 together. Memory section 1008 may have memory module 1020 related to it. Memory module 1020 may be, for example, a flash memory and/or a removable memory device. The I/O section 1004 is connected to network interface 1012, which receives and/or transmits network packets. I/O section 1004 may be connected to display 1014, input device 1016, and/or storage unit 1018. Memory section 1008, memory module 1020, and/or storage unit 1022 can store (e.g., tangibly embody) a computer-readable medium that contains computer-executable instructions and/or data for performing any one of the above-described processes using CPU 1006. The computer-executable instructions may be written, for example, in a general-purpose programming language (e.g., LISP, C, JSON) or some specialized application-specific language. Input device 1016 may be a USB port supporting input from USB-compliant devices, such as a keyboard, a mouse, a memory stick, or the like. At least some values based on the results of the above-described processes can be saved into memory such as memory 1008, memory module 1020, and/or disk storage unit 1018 for subsequent use.

Portions of above-described processes also may be implemented into a processor by way of specifically arranged integrated circuits (e.g., application-specific integrated circuits). In some embodiments, the integrated circuit can be part of the main processor of a device, such as the main processor of a cellular phone. In some embodiments, the integrated circuit can be part of an auxiliary processor of a device, such as a processor that is connected to the motherboard of a laptop. The integrated circuits can contain computer-executable instructions and/or data for performing any one of the above-described processes. The computer-executable instructions may be written, for example, in a specialized application-specific (e.g., processor-specific) language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this technology.

What is claimed is:

1. A method of promoting security of a computer network, the method comprising:
   identifying, by a first network activity detector coupled with the network, a second network activity detector as a source of configuration information, wherein the second network activity detector is coupled with the network, wherein the configuration information includes a set of information for detecting digital security threats, wherein a first device includes the first network activity detector, wherein a second device includes the second network activity detector, wherein the first device is remote from the second device;
   sending, by the first network activity detector, a request for the configuration information to the second network activity detector;
   receiving, by the first network activity detector, the configuration information from the second network activity detector; and
   sending, by the first network activity detector, the configuration information to a third network activity detector, wherein a third device includes the third network activity detector, wherein the third device is remote from the first device, and wherein the third device is remote from the second device.

2. The method of claim 1, wherein:
the request is sent using a UDP network packet.

3. The method of claim 1, wherein:
the configuration information sent by the first network activity detector to the third network activity detector is at least partially encrypted; and
the encryption is based on one or more of a MAC address of the third network activity detector, a process identifier of an operating environment running on the third network activity detector, and a serial number of a processor of the third network activity detector.

4. The method of claim 1, further comprising:
creating another set of configuration information.

5. The method of claim 1, further comprising:
receiving, from the third network activity detector, a request for the configuration information; and
instructing, by the first network activity detector, the third network activity detector to send future requests for configuration information to a fourth network activity detector,
wherein the fourth network activity detector is different from the first network activity detector.

6. The method of claim 5, further comprising:
instructing, by the first network activity detector, the fourth activity detector to respond to requests for configuration information.

7. The method of claim 1 further comprising:
receiving, by the first network activity detector, network activity; and
analyzing, by the first network activity detector, the network activity, wherein the third network activity detector is configured to receive and analyze network activity.

8. A non-transitory computer-readable storage medium having computer-executable instructions, wherein the computer-executable instructions, when executed by one or more computer processors, cause the one or more computer processors to promote security of a computer network, the computer-executable instructions comprising instructions for:
identifying, by a first network activity detector coupled with the network, a second network activity detector as a source of configuration information, wherein the second network activity detector is coupled with the network, wherein the configuration information includes a set of information for detecting digital security threats, wherein a first device includes the first network activity detector, wherein a second device includes the second network activity detector, wherein the first device is remote from the second device;
sending to the second network activity detector, by the first network activity detector, a request for the configuration information;
receiving from the second network activity detector, by the first network activity detector, the configuration information; and
sending to a third network activity detector, by the first network activity detector, the configuration information, wherein a third device includes the third network activity detector, wherein the third device is remote from the first device, and wherein the third device is remote from the second device.

9. The computer-readable storage medium of claim 8, wherein:
the request is sent using a UDP network packet.

10. The computer-readable storage medium of claim 8, wherein:
the configuration information sent by the first network activity detector to the third network activity detector is at least partially encrypted; and
the encryption is based on one or more of a MAC address of the third network activity detector, a process identifier of an operating environment running on the third network activity detector, and a serial number of a processor of the third network activity detector.

11. The computer-readable storage medium of claim 8, wherein the computer-executable instructions further comprises instructions for:
creating another set of configuration information.

12. The computer-readable storage medium of claim 8, wherein the computer-executable instructions further comprises instructions for:
receiving, from the third network activity detector, a request for the configuration information; and
instructing, by the first network activity detector, the third network activity detector to send future requests for configuration information to a fourth network activity detector,
wherein the fourth network activity detector is different from the first network activity detector.

13. The computer-readable storage medium of claim 12, wherein the computer-executable instructions further comprises instructions for:
instructing, by the first network activity detector, the fourth activity detector to respond to requests for configuration information.

14. The computer-readable storage medium of claim 8, wherein the identifying comprises determining that the second network activity detector is in a predefined operating mode.

15. A network activity detector, comprising:
a network interface configured to couple with a network; and
a processor configured to:
identify a second network activity detector as a source of configuration information, wherein the second network activity detector is coupled with the network, and wherein the configuration information includes a set of information for detecting digital security threats, wherein a first device includes the first network activity detector, wherein a second device includes the second network activity detector, wherein the first device is remote from the second device;
send, to the second network activity detector, a request for the configuration information;
receive, from the second network activity detector, the configuration information; and
send, to a third network activity detector, the configuration information, wherein a third device includes the third network activity detector, wherein the third device is remote from the first device, and wherein the third device is remote from the second device.

16. The network activity detector of claim 15, wherein:
the request is sent using a UDP network packet.

17. The network activity detector of claim 15, wherein the network activity detector is a first network activity detector, and wherein:
the configuration information sent by the first network activity detector to the third network activity detector is at least partially encrypted; and the encryption is based on one or more of a MAC address of the third network activity detector, a process identifier of an operating environment running on the third network activity detector, and a serial number of a processor of the third network activity detector.

18. The network activity detector of claim 15, wherein the processor is further configured to: create another set of configuration information.

19. The network activity detector of claim 15, wherein the network activity detector is a first network activity detector and the processor of the first network activity detector is further configured to:
   receive, from the third network activity detector, a request for the configuration information; and
   instruct, by the first network activity detector, the third network activity detector to send future requests for configuration information to a fourth network activity detector,
   wherein the fourth network activity detector is different from the first network activity detector.

20. The network activity detector of claim 19, wherein the processor is further configured to:
   instruct, by the first network activity detector, the fourth activity detector to respond to requests for configuration information.

21. The network activity detector of claim 15, wherein the identifying comprises determining that the second network activity detector is in a predefined operating mode.

* * * * *